PLOW

Original Filed May 22, 1959 3 Sheets-Sheet 1

William R. Bertelsen
INVENTOR

BY G. W. Holmes

William R. Bertelsen
INVENTOR

BY

PLOW

Original Filed May 22, 1959

William R. Bertelsen
INVENTOR
BY G. W. Holmes

United States Patent Office

Re. 26,098
Reissued Oct. 11, 1966

26,098
PLOW

William R. Bertelsen, Neponset, Ill.

Original No. 3,063,506, dated Nov. 13, 1962, Ser. No. 815,114, May 22, 1959. Application for reissue July 18, 1963, Ser. No. 296,891
6 Claims. (Cl. 172—755)

Matter enclosed in heavy brackets [ ] appears in the original patent but forms no part of this reissue specification; matter printed in italics indicates the additions made by reissue.

The present invention relates broadly to material moving equipment. While many of several different attributes of the invention can be utilized for different material moving requirements, such as augers and grader blades for example, it is deemed sufficient for a full disclosure of principles involved to describe in detail only one device, namely a plow for breaking and turning sod, soil, and the like.

Plows now in general use usually are made of a cast iron or steel frog attached to or integral with the beam by which the plow is drawn. This frog (also known as the bottom) forms a frame supporting the share, moldboard, and landside to complete the plow. The share cuts a slice of soil loose from the ground, the moldboard defines a furrow and directs the soil to turn same, and the landside opposes the pressure exerted by the soil upon the moldboard. Many plows also mount coulters or jointers to cut earth ahead of the share to form a sharply defined furrow. In addition, several plows or bottoms may be arranged with relation to each other to cut several furrows simultaneously and are then called a gang-plow. These are usually wheel mounted, and one or more of the wheels can then perform the function of the landside.

The number of bottoms that can be drawn as a gang-plow for a given draft is determined by many factors. With carbon steel moldboards that take a high degree of polish more bottoms can be pulled for a given draft than with softer steels that may be pitted or scratched more easily than carbon steel. Soils with scouring constituents such as fine sand, loess, volcanic ash, or the like, scour better than many other soils, and the draft required thereby is rather generally accepted as a standard for design of both bottoms and tractors for use therewith.

There are many soils, and other materials, that by these presently accepted standards are not considered practicably movable by present plows. In general, these materials include tacky or adhesive substances. In particular, in earth plowing, these include among others, soils with clay content, peat, marshy or wet soils of several kinds, deep rooted sod, and various mixtures of the like. Many of these earths are the most fertile for several crops. However, most of them are idle, even for grazing, because it has been impossible or impractical to prepare proper seed beds therein for crops or grazing usage.

The present invention employs a new principle of material moving. This principle can be applied to plowing, as one specific example, in a manner to be pointed out fully below. In broad concept, the principle comprises the introduction of a lubricating and/or scouring medium between the moldboard and other plow parts, and the earth moved thereby to enable a plow to be drawn through adhesive materials practicably. It is to be noted below that the principle enables more bottoms to be drawn through soils presently worked by present plows for a given draft. It is further possible to draw the bottoms at higher translational speeds because of reduction of friction between plow parts and the soil. In addition, the principle will enable several additional functions to be attained simultaneously such as plowing, fertilizing at the bottom of the furrow, breaking and/or discing, harrowing, planting, and covering and packing. Of course, it is to be recognized, all of the above operations are not needed for different crops, and any suitable program can be arranged by a train of known farm machines.

Accordingly, it is a broad object of the invention to provide mechanism for moving material in a new and useful manner.

A further object of the invention is to provide mechanism for moving material at a lower frictional resistance than normally existing between the surfaces of the mechanism and the material.

A still further object of the invention is to provide a plow, or the like, for introducing substances between a part of the plow and the material moved by the plow to attain a predetermined purpose.

Other objects and advantages of the invention reside in the details of construction and the configuration of parts and will be either obvious or pointed out in the following specification and claims.

Figure 4:
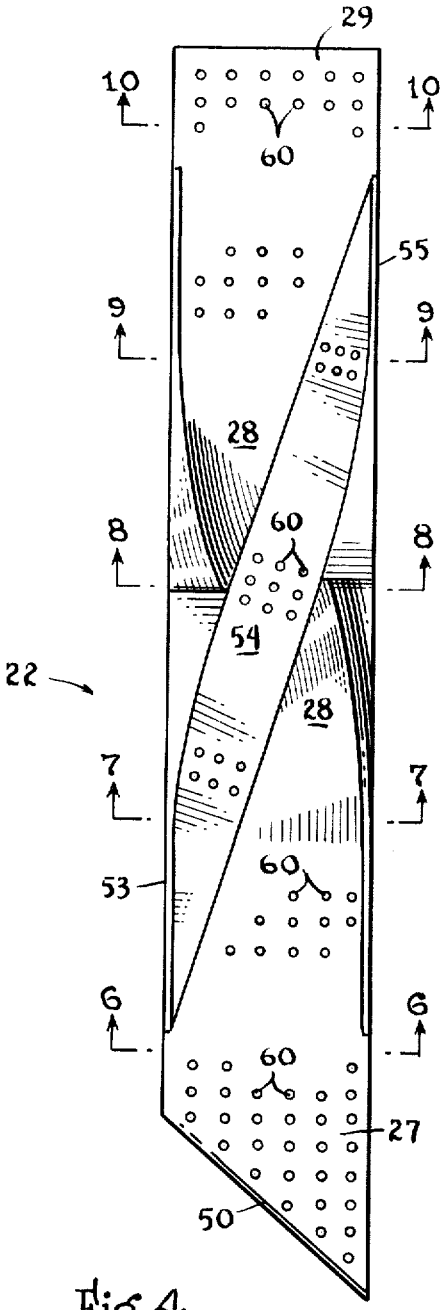
FIG. 4 is a plan view of a single bottom.
Figure 10:
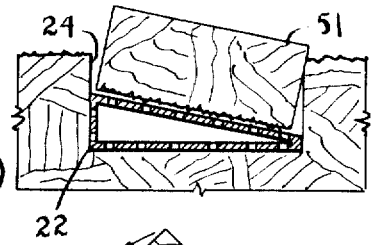
Figure 9:
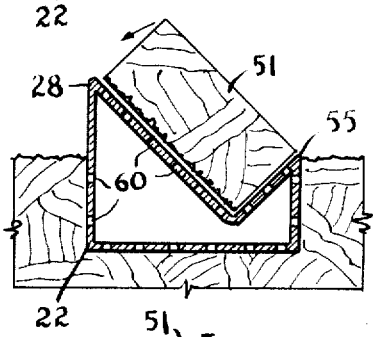
Figure 8:
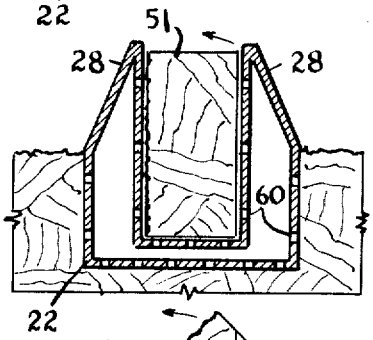
Figure 7:
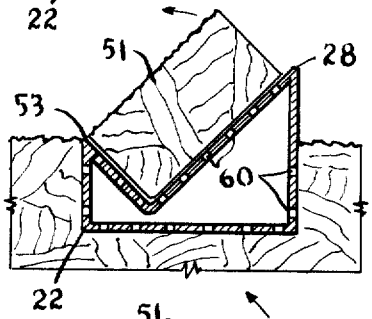
Figure 6:
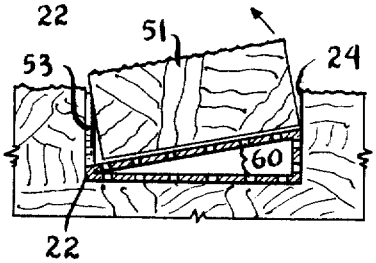
Figure 11:
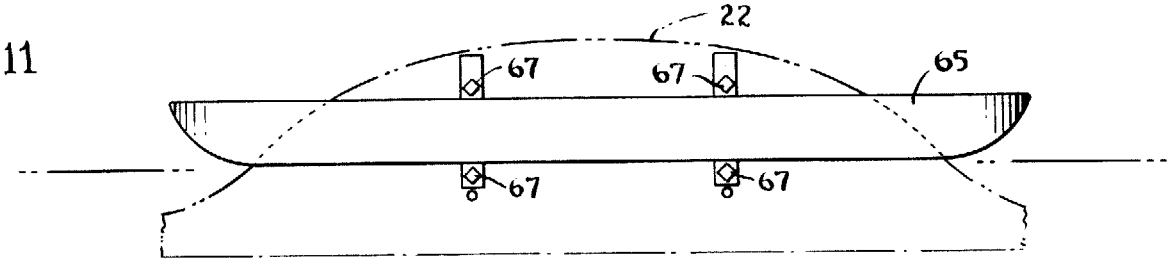
Figure 12:
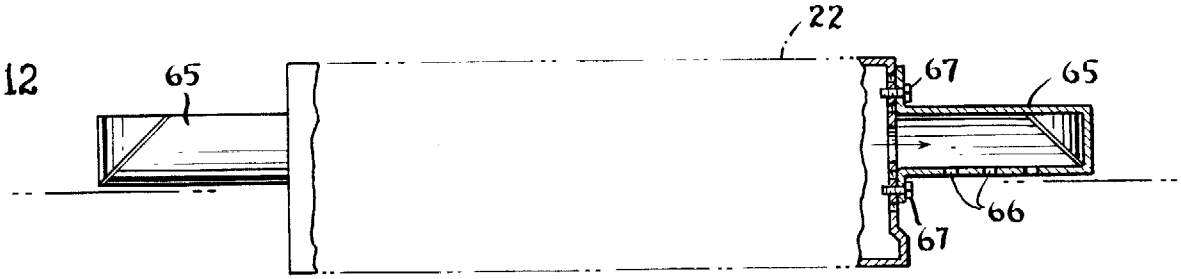

FIGS. 6 through 10 are sectional views taken progressively along the bottom shown in FIG. 4 at lines 6—6, 7—7, 8—8, 9—9, and 10—10, FIG. 11 is a side elevational view of a modification of the invention, and, FIG. 12 is a partial elevational and sectional view from the left side of FIG. 11.

The invention described below is supported on a cushion of air. My prior application S.N. 731,001, filed April 25, 1958 and entitled, Vehicle, explains in detail, principles involves broadly herein, and reference thereto may be had if necessary.

Before referring to details of construction of the invention with particularity, it is deemed proper to refer to some general attributes, features, and distinct advantages. The plow to be described is adapted to operate at a higher translational speed than present plows. As now practiced wisely, known plows cut a furrow, rotate, and transfer same to a position lateral with respect to the path traversed. It is readily apparent that such throwing action limits the translational speed to a relatively low value in order to keep turning successive strips of earth into previously cut furrows.

The present invention cuts, rotates, and deposits a strip of earth out of and back into the same furrow. Such attribute affords many advantages, and not all need to be recited because they are deemed to be obvious and inherent. For example, it is not necessary to measure a field to plow outward one season and inward the next to prevent diminution of useful top-soil in a given field. Plowing can start from a side, or any other place, and be continued across a field without displacement of soil, but only turning of same. The individual bottoms can be relatively long so that rotational forces are low (below one times gravity) to inhibit throwing of the soil.

This invention further enables convenient introduction of various materials into soil such as fertilizer, filler, insecticides, and the like. Because of construction of the plow, materials not readily or economically applied by presently known methods can be introduced into the soil. For example, some known dusts are so easily airborne that general or wide usage is inhibited. A cheap and abundant fertilizer in many parts of the world is loess. However, in its dry and powdered state it is airborne in even a mild breeze. The present invention can introduce such materials simply and readily by entraining same in the stream of air that supports the plow. Such entrained material will be trapped beneath a turned furrow where it can do the most good. Also scouring materials, gases, or liquids can be entrained as desired.

Figure 1:
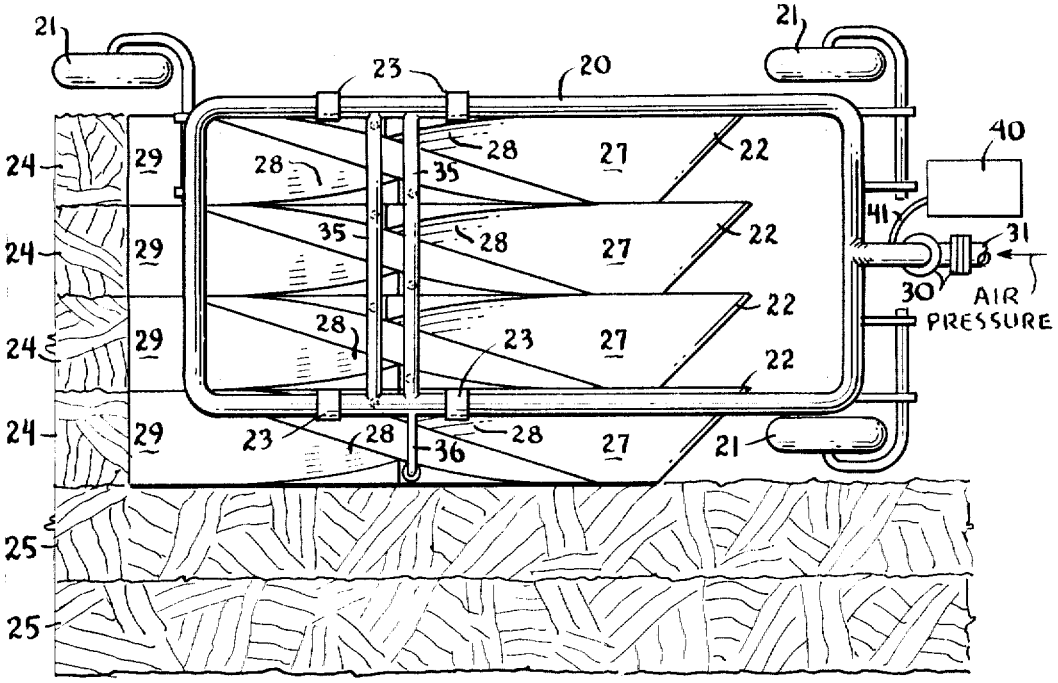
FIG. 1 is a plan view of a gang-plow constructed according to the invention.
Figure 2:
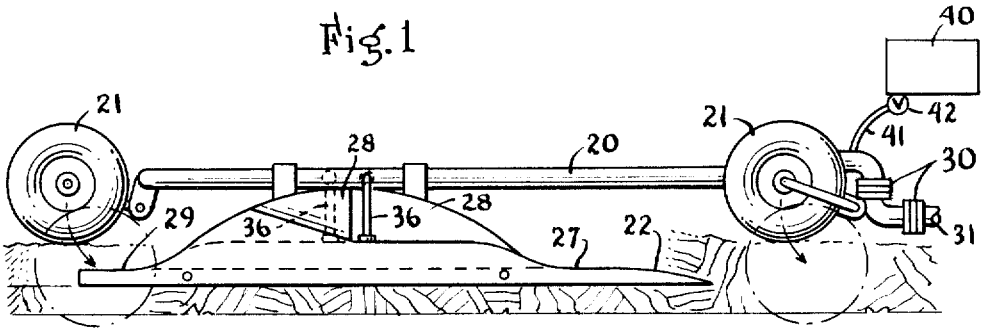
FIG. 2 is a side elevation orthographically projected from FIG. 1.
Figure 3:
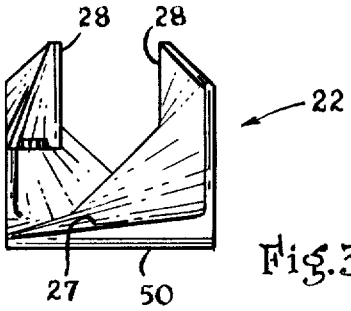
FIG. 3 is a front elevational view of a single bottom.

Referring now in detail to the drawings, and first to FIGS. 1 and 2; a frame 20 is shown as supported on three suitably mounted wheels 21 adapted to traverse unplowed ground. These wheels 21 can be adjusted up and down by suitable equipment (not shown) and lowered to the dotted line position shown in FIG. 2 for removing the plow from the soil entirely for transport and turning same. If desired, a fourth wheel may be supplied adjacent the lower left hand (FIG. 1) corner of the frame for additional stability in transport. As will appear below, during ordinary plowing an air cushion beneath the plow contributes to the support of the plow.

Four identical bottoms 22 are conveniently connected to each other and the frame 20 by weld straps 23. The bottoms 22 are shown ahead of four strips of turned earth 24 adjacent previously turned strips 25, only two of which are shown. If desired, discs or the like (not shown) can be secured to the right side (FIG. 1) reach of the frame 20 to cut the soil and thus define the sides of the furrows. Soil is not shown on the top 27 of the bottoms for clarity of the plow structure. Soil is lifted in a strip by the leading edge of a bottom 22 out of a furrow, rotated by the top 27 guided by wings 28 through 180 degrees and deposited off a trailing edge 29 back into the furrow.

A universal hitch 30 may connect the plow through a pipe 31, to a tractor (not shown). A conventional air compressor or blower powered by the tractor engine can supply air under pressure through the pipe 31 to the frame 20 which is a pipe to conduct air through pipes 35 into pipes 36 thence into the interior of the bottoms 22 which are hollow. Materials can be entrained in the air stream within the pipe system and the interiors of the bottoms from a supply tank or hopper 40 through a tube 41 under control of a metering valve 42. As will be obvious from the description below, such materials should be of such physical nature or size as to pass conveniently through perforations in the bottoms.

Figure 5:
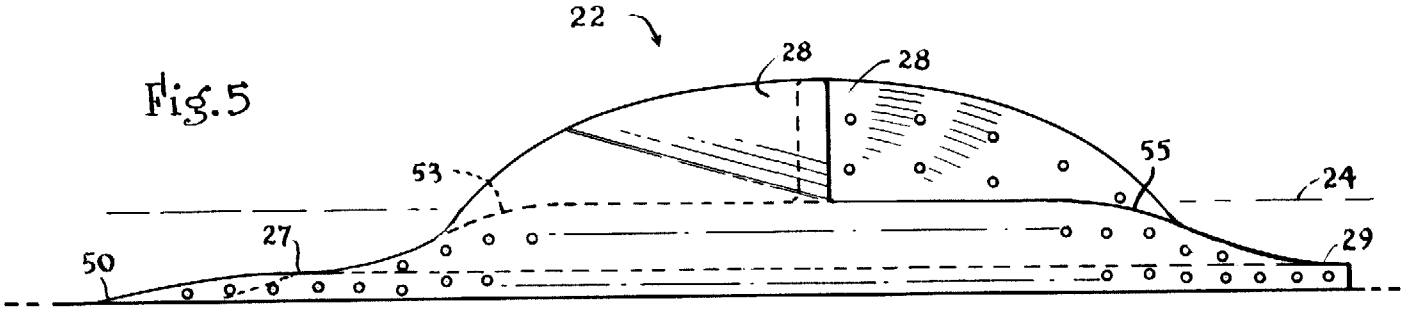
FIG. 5 is a left side elevational view of FIG. 4.

Referring now more specifically to FIGS. 3 through 10, a bottom 22 has its top 27 tapered to a sharp leading edge 50 wherewith to cut and lift a strip of soil 51. This strip of soil 51 begins to be rotated counterclockwise (FIGS. 6 through 10) as the bottom 22 moves along a furrow 24 (FIGS. 1 and 5). As shown most clearly in FIGS. 6 through 10 the strip of soil 51 turns smoothly through 180 degrees. The top 27 of the bottom 22 rises to become one side wing 28, the opposite side wing 28 begins at the line 8—8 (FIG. 4) and falls to become the trailing edge 29. A lower and opposite side wing 53 turns and lowers counter clockwise to form a middle top surface 54 to support the strip of soil 51 on edge as it is turned. The surface 54 continues to turn into a low trailing wing 55.

The bottom 22 has perforations preferably though not essentially on all surfaces that engage the soil. Air under pressure is fed through these perforations and creates a film of air between the soil and the surface of the bottom 22. The size and number of these perforations can be selected to obtain desirable operational characteristics. As the size of the perforations is varied the frictional resistance is controlled, that is, the pressure drop due to viscous friction through a smaller orifice (perforation) is greater than through a larger orifice with edges considered in uniform condition. Because the perforations are drilled preferably such edges will be substantially identical in physical characteristics. Varying the number of holes will vary the mass of air delivered adjacent a given area of a bottom and the soil in proximity therewith.

It has been found that high air pressure is not required. As a specific and [non-resisting] *non-restricting* example, a plow bottom sixteen inches wide and seven feet long cutting a strip of soil four inches thick having a density of one hundred pounds per cubic foot will support about three hundred pounds of soil at a time. The effective projected area of the top of a bottom under a strip will be about eight square feet. Thus, the pounds of air pressure per square foot need not exceed forty pounds per square foot of projected top area to support this soil. Such pressure is seen as being less than a third of a pound per square inch. If the bottom in this example weighs six hundred pounds the pressure per square inch to support both the bottom and strip of soil will not exceed one pound per square inch.

Further according to the above example, in view of the disclosure of FIGS. 1 and 2, it is desirable to support some of the total weight of bottoms and soil on the wheels 21. Hence, either a low air pressure is used (for example, one half pound per square inch below the bottom) or only sufficient air is supplied to make up for that which escapes around the plow and the strip of soil 51. This can be done with more or less or smaller perforations 60, or by any well known throttling means such as by a valve in pipe 20 (not shown).

The bottoms described above can be assembled with respect to each other in different numbers as by bolting or welding, or staggered if desired, without departing from the spirit of the invention. Also, different depth strips can be accommodated conveniently without excess loss of air by spacing wings 28 to accommodate the thickest desired strip of soil and locating perforations 60 in the middle top surface 54 and wings 28 so as to be normally covered by the thinnest desired strip of soil.

The modification shown in FIGS. 11 and 12 employs bottoms 22 that may be substantially identical with the bottoms disclosed above. However, support pontoons 65, having perforations 66 therethrough, are connected to outside located bottoms 22 to take the place of the wheels described above in connection with the first modification. The pontoons 65 are secured to opposite sides of the bottoms 22 and supply additional support for the bottoms to define the depth of the furrows. The vertical position of the pontoons 65 with respect to the bottoms can be varied by securing same by adjustment bolts 67, or the like, in different mounting holes. This modification is especially useful in very large fields, as well as over very soft or swampy terrain in which wheels will fail to define proper furrows. In addition this modification can accommodate larger sized bottoms 22 than can be conveniently accommodated with wheels.

OPERATION

The first modification described above is shown as wheel or sulky mounted, and the second modification is shown with pontoons taking the place of wheels. It is within the spirit of the invention to mount bottoms directly upon a tractor, if desired, although it is not deemed necessary to specifically show such method of mounting. Regardless of the type of mounting, it is desirable to employ known mechanical or hydraulic means to lower the bottoms into the soil and withdraw them by raising the bottoms. Because of the length of the plow it is suggested in a non-restrictive sense that the following method of operation be utilized. Further, plowing a field from the perimeter to the center is also set forth in a non-restrictive specific example.

In a large square field a convenient method of plowing may be as follows: Corners of the field can first be plowed so that successive circling of the field will produce a steadily diminishing unplowed area in the center of the field. To lower the bottoms into unplowed soil it is suggested that the leading edges of the bottoms be lowered first to the desired depth of plowing. It is not essential that the trailing edge also be lowered, but for most efficient use of the plow it is preferred that they be so positioned. Such positioning can be accomplished in any of many ways. For example the natural "suction" (weight of a strip being turned) can cause lowering of the plow against spring mountings (not shown) in trailing wheels or adjacent the trailing portions of the pontoons of FIGS. 11 and 12. Also, hydraulic or mechanical means can be utilized.

Once a bottom is down in a furrow it will tend to be maintained there by "suction." To raise the plow above the surface of the soil it is only necessary to raise the leading edge. The trailing edge will naturally follow and ride the surface of the soil, or can be raised still higher by known means. Specific structures for performing these functions have not been shown. Such structures may vary greatly in specific detail, and do not at this time comprise subject matter, per se, of this invention.

For back and forth "strip" plowing, the plow is lowered at the beginning of each "strip" and raised after completion of same. Such manner of plowing is best suited for contour cropping and the present invention is eminently suited for such manner of cropping because it lays a strip of soil back into the same furrow from which it is temporarily removed. This function prevents much of a kind of erosion now extant that occurs between the time plowing starts until the time of rooting of crops to hold the soil because it reduces the amount of disturbance of soil and breaking up of existing roots in same.

While I have shown and described only preferred broad features and attributes of the invention, obviously modifications will occur to others skilled in the art. Hence I desire to be limited in my invention only by the scope of the following claims.

I claim:

1. A plow for removing a strip of earth from a furrow and turning same through a predetermined path of rotation comprising, in combination; a substantially flat bottom surface of predetermined area, said bottom surface further having a predetermined open area therein consisting of a plurality of holes; at least one landside surface of predetermined area connected to said bottom surface at substantially a right angle, said landside surface having a predetermined open area therein consisting of a plurality of holes; a curved top surface of predetermined [are] *area* for directing said strip of earth and being connected between said bottom and landside surfaces to form an airtight enclosure therewith except for said open area, said top surface having a predetermined open area therein consisting of a plurality of holes; the open area of said bottom surface being sufficient to provide enough pressurized air to react between the earth and said bottom surface to support the entire plow and a strip of earth thereon, the open area of said top surface being sufficient to provide enough pressurized air to react between the strip of earth and said top surface to support the strip of earth thereon, the open area of said landside surface being sufficient to provide enough pressurized air to react between the earth and said landside surface to balance the reaction of turning of the earth by the plow; and a source of pressurized air connected to the interior of said plow for continuously supplying air to said plow.

2. A plow for removing a strip of earth from a furrow and turning same through a predetermined path of rotation comprising, in combination; a substantially flat bottom surface having a predetermined open area therein consisting of a plurality of holes; a pair of oppositely arranged landside surfaces connected to said bottom at substantially right angles, each of said landside surfaces having a predetermined open area; a curved top surface connected between said bottom and landside surfaces to form an airtight enclosure therewith except for said open area, said top surface having a predetermined open area; the open area of said bottom surface being sufficient to provide enough pressurized air between the earth and said bottom surface to support the entire plow and a strip of earth thereon, the open area of said top surface being sufficient to provide enough pressurized air between the strip of earth and said top surface to support the strip of earth thereon, the open area of said landside surfaces being sufficient to provide enough pressurized air between the earth and said landside surface to balance the reaction of turning of the earth by the plow; and a source of pressurized air connected to the interior of said plow for continuously supplying air to said plow.

3. The plow defined in claim 1 including; auxiliary ground engaging means connected to the plow for supporting the same in relation to the ground surface to define the thickess of said strip of earth.

4. The plow defined in claim 2 including; auxiliary ground engaging means connected to the plow for supporting the same in relation to the ground surface to define the thickness of said strip of earth.

*5. In a plow for cutting a strip of earth to form a furrow and turning same through a predetermined path of rotation, a share for initially engaging and shearing said strip of earth, a perforated moldboard connected to said share for receiving said strip of earth from said share, said moldboard being shaped to turn said strip of earth through said predetermined path, housing means carried by said moldboard to form an air chamber in fluid communication with said perforations, an air compressor, motor means connected thereto for operating the same, means connecting the outlet of the compressor to said chamber for continuously supplying pressurized air to said chamber, the perforations in said moldboard being of different preselected sizes adjacent at least one preselected area of said moldboard to control the mass of air delivered therefrom, said perforations being sized to cause a pressure drop in air flowing therethrough to prevent high velocity escape of air to aid entrapping of same beneath the strip of earth moving adjacent the earth turning surface of said moldboard whereby pressurized air supplied through said perforations will support said strip of earth upon the surface of said moldboard while same is being turned through said predetermined path of rotation.*

*6. In a plow for cutting a strip of earth to form a furrow and turning same through a predetermined path of rotation, a share for engaging and shearing said strip of earth, a perforated moldboard carried by said share for receiving said strip of earth from said share, said moldboard being shaped to turn said strip of earth through said predetermined path, housing means carried by said moldboard to form a chamber in fluid communication with said perforations, an air compressor, motor means connected thereto for operating the same, means connecting the outlet of the compressor to said chamber for continuously supplying pressurized air to said chamber, the perforations in said moldboard being of preselected different sizes adjacent at least one preselected area of said moldboard to control the mass of air delivered therefrom, and the perforations further being in varying numbers adjacent different areas of said moldboard to vary the mass of air delivered therefrom to different areas of a strip of earth adjacent said moldboard in said path of ro-*

*tation, said perforations being sized to cause a pressure drop in air flowing therethrough to prevent high velocity escape of air to aid entrapping of same beneath the strip of earth moving adjacent the earth turning surface of said moldboard whereby pressurized air supplied through said perforations will support a strip of earth upon the surface of said moldboard while same is being turned through said predetermined path of rotation.*

References Cited by the Examiner

The following references, cited by the Examiner, are of record in the patented file of this patent or the original patent.

UNITED STATES PATENTS

| | | | |
|---|---|---|---|
| 223,124 | 12/1879 | Fields | 172—755 |
| 266,121 | 10/1882 | Etzler | 172—755 |
| 1,445,148 | 2/1923 | Ledbetter | 172—755 |
| 1,897,444 | 2/1933 | Stark. | |

| | | | |
|---|---|---|---|
| 2,125,036 | 7/1938 | Stewart. | |
| 2,222,437 | 11/1940 | Lykken | 37—19 X |
| 2,887,169 | 5/1959 | Watson. | |
| 2,918,183 | 12/1959 | Peterson et al. | |
| 2,938,590 | 5/1960 | Barnett. | |
| 3,031,854 | 1/1962 | Willner | 172—755 |

FOREIGN PATENTS

| | | |
|---|---|---|
| 173,371 | 1/1886 | France. |
| 713,944 | 8/1931 | France. |
| 894,485 | 12/1944 | France. |
| 769,363 | 3/1957 | Great Britain. |
| 76,126 | 5/1949 | Norway. |
| 116,485 | 3/1958 | Russia. |

ABRAHAM G. STONE, *Primary Examiner.*

T. GRAHAM CRAVER, *Examiner.*

J. R. OAKS, *Assistant Examiner.*